United States Patent [19]
Howard

[11] 3,986,914
[45] Oct. 19, 1976

[54] HEAT-SEALING METHOD FOR PLASTIC CONTAINERS

[75] Inventor: H. Keith Howard, Ulysses, Kans.

[73] Assignee: Uly-Pak, Inc., Ulysses, Kans.

[22] Filed: Aug. 22, 1974

[21] Appl. No.: 499,801

Related U.S. Application Data

[62] Division of Ser. No. 225,430, Feb. 11, 1972, Pat. No. 3,847,711.

[52] U.S. Cl. ............................. 156/251; 93/33 H; 93/DIG. 1; 156/228; 156/306; 264/248
[51] Int. Cl.² ................. B30B 15/34; B32B 31/18; B32B 31/04
[58] Field of Search .......... 156/251, 515, 583, 228, 156/581, 66, 306, 217; 53/373; 150/3; 264/248; 93/33 H, 8 R, DIG. 1

[56] References Cited
UNITED STATES PATENTS

| | | |
|---|---|---|
| 3,481,100 | 12/1969 | Bergstrom .......................... 53/373 |
| 3,506,516 | 4/1970 | Baumann .......................... 156/217 |
| 3,554,822 | 1/1971 | Schwarzkopf ...................... 156/66 |

Primary Examiner—Douglas J. Drummond
Assistant Examiner—M. G. Wityshyn
Attorney, Agent, or Firm—Jones, Tullar & Cooper

[57] ABSTRACT

A plastic container is provided with a plastic bead seal at the junction of the interlocking fastener and the side edges of the container. The plastic bead seal acts as a barrier to the passage of fluids or contaminating bacteria through the fastener at this junction. A method and apparatus are provided for flowing plastic under heat and pressure into and across the junction to form the bead seal barrier.

11 Claims, 12 Drawing Figures

HEAT-SEALING METHOD FOR PLASTIC CONTAINERS

This application is a division of application Ser. No. 225,430, filed on Feb. 11, 1972, entitled "Heat Sealing System for Plastic Containers", which application issued as U.S. Pat. No. 3,847,711 on Nov. 12, 1974.

BACKGROUND OF THE INVENTION

This invention relates to the manufacture of a plastic container which may be used for the shipment, storage and sterilization of items such as biological specimens, medical instruments, hospital linen and foods. The plastic container in most instances is in the form of a bag or a pouch having two generally parallel walls which are joined together at their respectively mated side and bottom edges to form a support for any item held within the container. The upper edges of the two walls are matched but are freely spaced from one another to define a container mouth for access to the support portion of the container. The container mouth may be provided with any one of the many types of known openable and reclosable, interlocking fasteners which are capable of being fitted integrally with the upper wall edges defining the container mouth. In general, such fasteners extend entirely across the container mouth, contacting the two sealed edges at the sides of the container to form junctions therewith. When the fastener is in a closed position, it provides a relatively good seal for the container, and as a result such containers have found wide commercial acceptance. However, it has been found that the seal provided by interlocking fastener closures are not entirely satisfactory since they have a tendency to leak, and thus their use in some applications has been limited.

Typically, the two-wall plastic containers which are fitted with the interlocking fasteners of the prior art are made in the following manner. A sheet of plastic stock is folded longitudinally to form a two-wall structure, one wall being connected to the other at this stage by only a folded bottom. The side edges of the walls in the folded structure are aligned by the folding step and the top edges of the walls are spaced and offset to accommodate the subsequent placement of an interlocking fastener along these top edges. Since the interlocking fasteners of the prior art usually have two mating portions, one portion of the fastener is sealed to the top edge of one container wall while the other portion of the fastener is sealed independently to the top edge of the other wall. The two top edges now each having a portion of the fastener sealed thereto are aligned and pressed together to interlock the fastener portions which, in turn, serves to interlock the two top edges. At this stage of the process, the container takes the form of a generally tubular structure having a bottom closed by a fold, two top edges interlocked together by the fastener, and two side edges which are still in an aligned, but freely spaced, relationship. In order to form a closed container, heat and pressure are applied to each of the side edges to heat seal them together along their entire length. Accordingly, the prior art containers are formed in the shape of a bag or a pouch having two heat-sealed side edges, a folded bottom and a mouth portion which is openable and reclosable by means of an interlocking fastener secured to the top edges of the container.

During the heat sealing step of the prior art process, pressure was normally applied along the entire length of the side edges of the container being formed, and included the application of pressure at the junction of each side edge with the interlocking fastener that extended across the top edges of the container. The application of pressure at these junctions was considered necessary to effectively heat seal the side edges to each other and to the top edges of the container walls as well as to close the ends of the fastener. Unfortunately, it was found that containers made in this manner tend to leak and thus were unsatisfactory for the storage or transport of fluid materials.

Upon an examination of the prior art containers to determine why they were incapable of holding fluids, it was found that separation flaws had formed in the fastener near the junction of the fastener with the side edges of the container. It has now been discovered that there are two basic causes of these separation flaws. First, the application of pressure during the heat-sealing of the junction frequently places excessive stress on portions of the fastener at or immediately adjacent the junction, causing the interlocking parts of the fastener to spread or move, thus distorting the fastener profile. Second, the bulk and shape of the fastener often prevents the sealing mechanism from holding the parts of the container in firm contact after the plastic has been heated, so that a strong, continuous weld is not formed. These two factors permit, or even cause, a small separation of the container walls and the interlocking fastener at the edge junction, and a separation of the fastener itself, and these separations have been found to remain as flaws in the integrity of the fastener after the heat sealing step is terminated. Accordingly, even though the finished containers of the prior art are substantially fluid tight because of the folded bottom and heat-sealed side edge construction, they are often found to have a separation flaw at one or both ends of the fastener, at or immediately adjacent the junction of the fastener with the side edge portions of the container. When fluid is placed in these flawed containers and the interlocking fastener is closed for shipment or storage, the fluid has had a tendency to seep into the fastener and travel therealong until it reaches the separation flaws at the ends of the fastener, where the liquid seeps through the separation to the exterior of the container. Further, in the case where objects in the container were originally in a sterile condition, it was found that contaminating bacteria could follow the same path, and thus pass through the separation flaw and into the container.

SUMMARY OF THE INVENTION

It is, therefore, an object of the present invention to provide a method and apparatus for making plastic bag-type containers which eliminate the problem of the formation of separation flaws in the fastener, by providing a plastic bead seal which bridges the junction of the fastener and the side edges of the container, thus acting as a barrier to passage of fluids therethrough.

It is another object of this invention to provide a fluid tight container for the shipment, storage and sterilization of items such as biological specimens, medical instruments, hospital linen and foods.

Further, it is an object of this invention to eliminate the separation flaws which occur near the junction of the fastener and the side edges of the prior art container.

Further still, it is an object of this invention to form a plastic bead seal at the junction of the fastener and the side edges of a container, which seal acts as a barrier to the passage of fluids or contaminating bacteria through the container at this junction.

It is an additional object of this invention to provide a heat-sealing method which controls the flow of plastic under heat and pressure into and across the junction of the fastener and the side edges of a plastic container.

Further still, it is an object of this invention to provide an apparatus for forming a plastic bead seal at the junction of the fastener and the side walls of a plastic container.

Briefly, the container of this invention can be described as having a first wall and a second wall in a generally parallel relationship which are joined together at their respective side edges and bottom edge. The upper edges of the first and second walls form an opening therebetween and have an interlocking fastener fitted integrally therewith. The fastener extends across the opening into contact with the joined side edges of the container to form junctions therewith. The instant invention provides a plastic bead seal which bridges each junction and acts as a barrier to prevent the passage of substances through the fastener at this point. This container is formed by a coordinated series of steps which result in the formation of the plastic bead seal at the junctions. The steps of this method include creating a pressure differential between the junction and the portion of the plastic container which is adjacent the junction so that the junction is at a lower pressure than the adjoining sections of the container. The container is then heated in the normal way to seal the edges, and heated plastic is forced by the pressure differential to flow into and across the junction, where the plastic flow is eventually solidified to form a plastic bead seal.

The apparatus used for carrying out this process includes a sealing means having a pressure bar arranged for reciprocal movement into and out of contact with the container, which is located on a cooperating surface, such as a sealing bar, or anvil. The sealing means applies heat and pressure to the junctions of the fastener with the side walls of the plastic container and to the portion of the container adjacent the junction. An important feature of the apparatus of this invention is the provision of a channel formed in the pressure bar, the disposition of the channel being such that the channel walls straddle and slightly pinch the fastener when the pressure bar and the sealing means are in contact with each other. This channel arrangement provides the pressure differential which causes the flow of heated plastic into the junctions to form bead seals.

BRIEF DESCRIPTION OF THE DRAWINGS

With reference to the above, the nature of the present invention will be more clearly understood by reference to the following detailed description of the views illustrated by the drawings, in which.

DESCRIPTION OF THE PREFERRED EMBODIMENTS

Figures 1, 2:
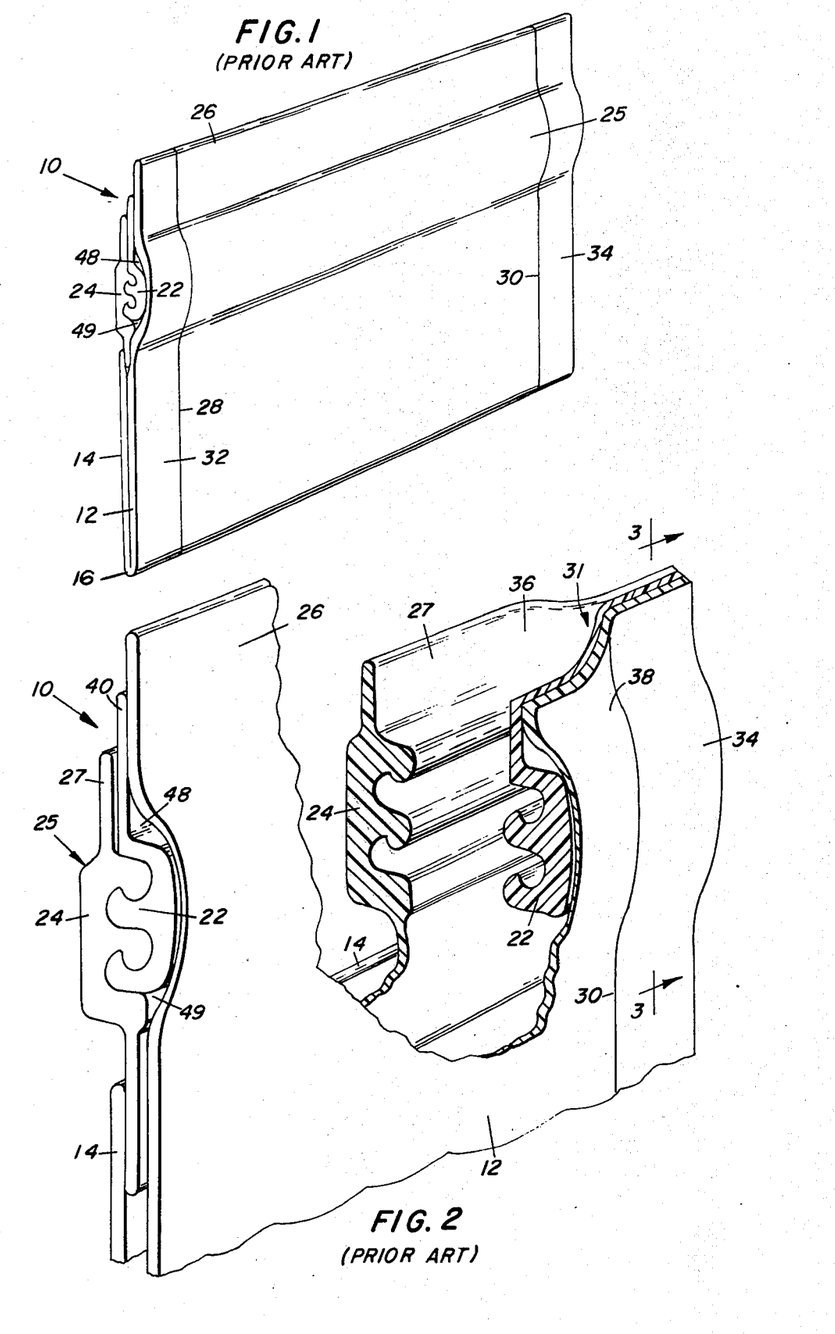
FIG. 1 is a perspective view of heat-sealed container having an interlocking fastener, and illustrating the location of some of the separation flaws which are corrected by this invention.
FIG. 2 is an enlarged partial perspective view of the container of FIG. 1, illustrating in greater detail the construction of the container.
Figures 3, 4, 5, 6:
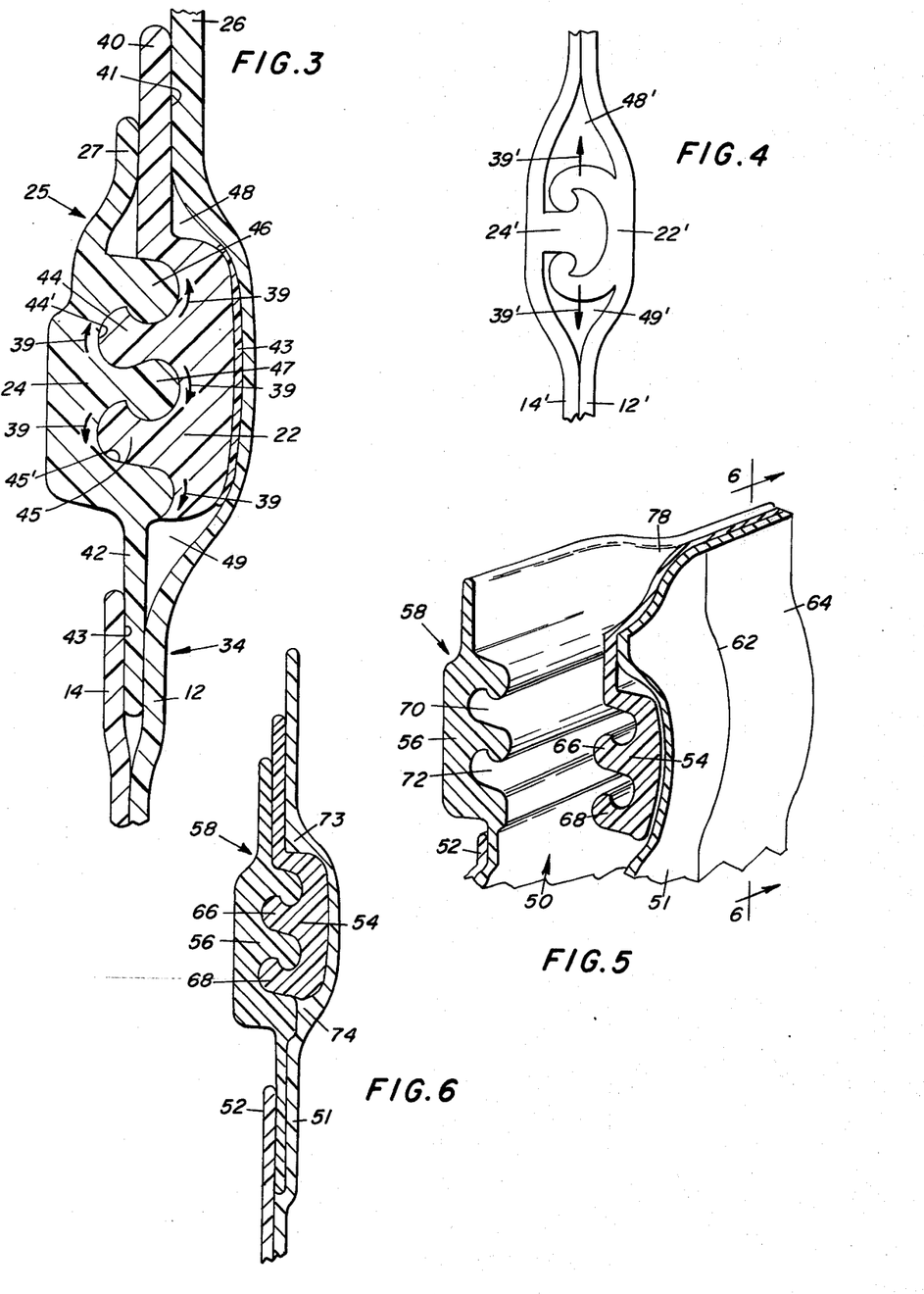
FIG. 3 is a cross-sectional view taken along line 3—3 of FIG. 2.
FIG. 4 is a partial end view of a modified form of fastener for the container of FIG. 1.
FIG. 5 is a perspective view of a portion of the container made in accordance with this invention.
FIG. 6 is a cross-sectional view taken along line 6—6 of FIG. 5.

Referring to FIGS. 1, 2 and 3 of the drawings, a plastic container or pouch 10 is shown having a front wall 12 with a corresponding back wall 14 joined thereto at the bottom by a fold 16. In FIG. 2, the top edges of the front and back walls carry the two halves 22 and 24 of a slideless, openable and closable interlocking fastener generally indicated at 25. These fastener halves may be formed in the side walls slightly below the top edges by a suitable molding process, or may be separately formed and heat sealed to the top edges. In either case, front and rear flaps 26 and 27 extending above the fastener are provided to permit easier opening of the fastener. As illustrated, the fastener extends across the top of the container and forms junctions 28 and 30 with the side edges 32 and 34 of the container where the walls 12 and 14 are sealed together. During most known plastic container fabrication processes, the two halves of the interlocking fastener are formed integrally with or secured to the top edges of the corresponding walls of the container before the side edges of the pouch are heat sealed together.

Prior to the sealing step, the container consists of a folded sheet of thermoplastic film of indefinite length, the fold forming the bottom of the container and the free edges of the sheet carrying the aligned portions of the fastener. Generally, the fastener is closed to hold the sheet in the proper configuration, and the sealing step is carried out by feeding the folded sheet into a thermal impulse heat sealing machine of the type sold, for example, by the Vertrod Corp. of Brooklyn, N.Y. Thermal impulse sealing, as is known, is a process of welding thermoplastic films in which the layers to be welded are clamped by a pair of jaws, one of which is a resilient pressure jaw, and the other of which is a heater jaw. The heater jaw contains a heater element in the form of a metal strip of low heat capacity that can be instantly heated by an electrical current and which will cool rapidly when the current is removed. After tightly closing the jaws over the film, an electrical impulse is applied to the heater for a short period, usually less than one second, to heat the film to its welding temperature. After the weld has been allowed to cool under pressure, the jaws are opened and the welded flims removed. If desired, the resilient pressure bar may be replaced with a second heater bar to permit welding of thick films or those requiring high temperature, or to reduce degradation of the film layer in contact with the heater.

The container blank, which is the folded sheet carrying the fastener halves along the aligned edges, thus is fed to the impulse sealing machine for completion of the bag or container by heat sealing two spaced narrow bands of plastic across the blank, one band on each side of the back to be formed. The resultant series of containers may be separated either by a subsequent cutting operation or the impulse heating machine itself may be used to cut them apart through the use of a cold wire cut-off. This is accomplished by means of a Teflon coated cutting wire mounted, for example, on the resilient pressure bar of the sealer jaws. When the sealing jaws are closed, the wire is forced through the heat softened film in the narrow band formed by the jaws, splitting the seal along its length and leaving two sealed edges, one forming the trailing edges of a first container, and the second forming the leading edge of a second container. If desired, a plurality of containers may be formed during each welding step by feeding a plurality of container blank sheets in parallel to the impulse sealer from one or more side-by-side rolls, with the sealer jaws dividing each blank into separable containers which may be cut apart either during the welding operation or subsequent thereto.

The heat and pressure applied to the edges of the containers during the heat sealing process are applied in the prior art by a bar having a flat surface which contacts the side edges of the container along portions 32 and 34 where the weld is to be formed and consequently extends across the fastener junctions 28 and 30 when the seals are being formed. However, the application of pressure at these junctions frequently places excessive mechanical stresses on the portions of the fastener immediately adjacent the junction, as at portions 36 and 38 of fastener halves 22 and 24 at junction 30. These stresses are caused by the fact that the fastener is thicker than the side walls 12 and 14 and, in order to weld the walls to one another between the parallel, flat jaw surfaces of the prior art sealing machines a relatively high pressure must be used. In most containers so formed, this stress is relieved by a deformation of the interlocking protrusion and grooves which form the fastener, as indicated by arrows 39 in FIG. 3, with the result that the halves of the interlocking fastener no longer fit tightly together at the points 36, 38, immediately adjacent the junction spreading apart the halves of the fastener and leaving an opening at 31 that cannot be properly closed. The pressure of the flat jaw surface on the raised fastener causes some of the heated plastic to flow away from the fastener, tending to flatten the fastener where it intersects the edge of the container, but this does not cure the problem caused by the deformation of the fastener. In addition, the flat jaw surface will often fail to produce a complete seal of the edge of the container at the fastener junction because of the relative bulk of the fastener at that location, as illustrated in FIG. 3.

Referring now to FIG. 3, which is a cross sectional view along lines 3—3 of FIG. 2, it will be seen that the fastener portion 22 includes an upward extension 40 which is sealed to the upper edge of container wall 12 at 41, while the fastener portion 24 is connected by way of a downward extension 42 to the upper edge of container 14, as at 43. The fastener portion 22 includes a pair of protrusions 44 and 45 which engage corresponding grooves 44' and 45' defined by the protrusions 46 and 47 of fastener portion 24. These latter protrusions in turn engage corresponding grooves in the fastener portion 22. When the flat jaw surfaces of the prior art sealing machines are brought into engagement with the front and back walls of a container blank to form a sealed edge 34, the heat and pressure generated thereby serve to seal the front and back walls together at the lower portion of the container which is being formed. Similarly, the flaps 26 and 27 at the top edge of the container are pressed together and sealed along the side edge 34, with the upper portion of flap 27 being sealed to extension 40, as illustrated. It will be apparent that this sealing occurs only in the area of side edge 34, and that across the remainder of the container package of the flaps 26 and 27 remain separate so that they may be used to open and close the container.

It is evident from the FIG. 3 illustration that the thickness of the fastener sections 22 and 24 is significantly greater than that of the side walls 12 and 14, and it is for this reason that the conventional thermal impulse machines cannot effect a complete seal immediately adjacent the fastener, in the areas indicated at 48 and 49. The thickness of the fastener prevents the jaws from closing far enough to bring the container wall 12 into contact with the downward extension 42 of fastener portion 22 in the area 49 or with the upward extension 40 of fastener portion 22 in the area indicated at 48. Although the melting of the plastic during the sealing operation causes the plastic to flow toward these areas, the lack of adequate pressure during the cooling period when the plastic hardens allows the openings to remain unsealed. Thus, when the formed container is separated from an adjacent container by a suitable cutter mechanism, the openings 48 and 49 are exposed at the edges of the container, as indicated in FIG. 1, and thus provided a passageway between the interior and exterior of the container. Although such a passageway normally will be very small, even a minute opening is sufficient to destroy the sterility of the contents of such a package or to allow liquids to lead out of the container.

In addition to the foregoing, the pressure and impulse heating operation causes the side wall 12 to be stretched over the surface of fastener portion 22 in an attempt to fill in the voids 48 and 49. This stretching causes the wall to thin out, and although it is sealed to the fastener portion 22 in the area generally indicated at 43 extending between the corners of the fasteners portion, the thinness of the side wall in this area weakness the container and increases the chances of leakage.

Although the problems encountered in forming containers having slideless interconnecting fasteners has been described with respect to an illustration of a particular style of fastener, it will be apparent that the problems of deformation of the fastener elements, failure to fill in open spaces because of the thickness of the fastener with respect to the container walls, and undue stretching of the side walls are common to containers utilizing virtually any style of fastener. Another example of the problem is given in FIG. 4 wherein a different style of fastener is utilized. In this device, the fastener portions 22' and 24' are extruded as parts of the container side walls 12' and 14', respectively. Here again, however, the exertion of pressure on the fastener during a sealing operation causes the interlocking protrusions to be deformed in the directions indicated by arrows 39' and the thickness of the fastener leaves voids 48' and 49' in the seal. It will be understood, of course, that the effects of the sealing operation are somewhat exaggerated in the drawings for purpose of illustration.

As a result of the foregoing, even though the finished container has a folded bottom and two side edge portions which are to all appearances completely heat sealed, the interlocking fastener extending across the top edge portion of the pouch is often found to have a separation flaw at one or both ends of the fastener, immediately adjacent the junction of the fastener and the heat-sealed side edges of the container or pouch. Therefore, when a liquid is placed in such a flawed container and the fastener is closed for subsequent shipment or storage of the liquid, the liquid has a tendency to seep into the fastener and travel therealong until it reaches the separation flaw, where the liquid can then seep through the separation to the exterior of the container. Further, in the case where an object, such as hospital linen, is originally placed in a sterile condition within the flawed container, contaminating bacteria can seep into the fastener through the same flaw and there pass into the interior of the container, thus destroying the sterility of the contents.

Figure 7:
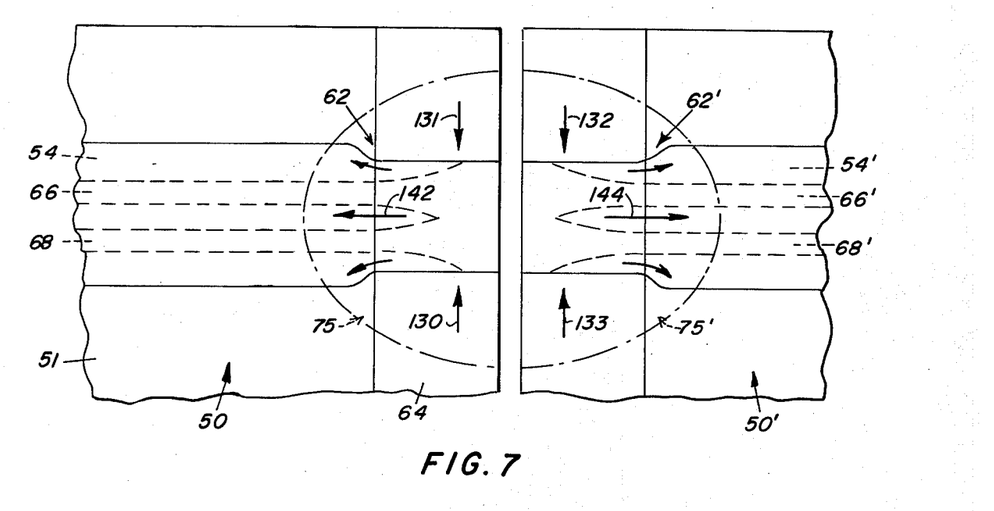
FIG. 7 is a side plan view of a portion of the container of FIG. 5.

Referring now to FIGS. 5, 6 and 7, a portion of a container made in accordance with the present invention is generally shown at 50. As with the prior art containers, this container is formed from a folded sheet of thermoplastic film so as to have front and back walls 51 and 52 which are joined at a bottom edge by a fold (not shown). Adjacent the top edges of the walls 51 and 52 are located the front and back halves 54 and 56 of an openable and reclosable, slideless, interlocking fastener 58 which extends across the top of the container. As before, the fastener forms a junction 62 with the side edge 64 of the container where the walls 51 and 52 are sealed together. As illustrated herein, the front portion 54 of the fastener comprises two parallel longitudinally extendiing protrusions 66 and 68 which are adapted to snap into corresponding parallel, longitudinally extending depressions, or grooves, 70 and 72 in the back portion 56 of the fastener. Although the protrusions and grooves are shown as being generally semicircular in cross section, it will be understood that other configurations may be used, in accordance with known methods of manufacturing fasteners of this type. The material of the fastener is flexible so that moderate pressure on the outer surfaces of the fastener will cause the two halves to engage each other and hold the container closed.

In order to insure a proper sealing engagement between the two halves of the container, a bead is formed at the junction 62 during the sealing operation in a manner to eliminate the separation flaw defects of the prior art. This bead seal is illustrated at areas 73 and 74 in FIG. 6 and by dotted lines at 75 and 75' in FIG. 7, which is a plan view of a portion of the container of FIG. 5. The bead seal is formed during the heat-welding of the container edge 64, and consists of plastic which is forced into the junction 62 during the heating of the container and fastener by the apparatus of the present invention. This plastic flow is into those areas where voids were left by prior art methods, and into the part of the fastener which was distorted by the pressure of the sealing mechanism. The bead thereby provides a fluid-tight closure for the plastic container where the fastener 58 joins the edge of side walls 51 and 52 of the plastic container, the bead being located in the exact area where separation flaws are found to occur in the prior art containers. Thus a barrier to the passage of liquid and bacteria through the area immediately near the junction is formed, and a sealable container is thereby provided. The plastic flowing into the junctions fills the voids 48 and 49 illustrated in FIG. 1, while the particular shape of the pressure jaws prevents distortion of the closure portions. Thus, the integrity of the fastener is maintained, and the container can be closed all the way across its top edge. As seen in a comparison of FIGS. 2 and 5, the elimination of the distortion caused by the prior art pressure jaws provides a smoother transition between the container opening and the sealed side edge, whereby the distortion at area 40 of FIG. 2 is eliminated, as may be seen at 78 in FIG. 5.

The bead seal described above and generally indicated at 75 is formed by a method which includes the steps of creating a pressure differential between the junction 62 and the regional area of the container adjacent the junction so that the junction is at a lower pressure than the remainder of the container, and then heating the plastic in the junction and in the regional area of the junction. The heated plastic is forced under pressure into and across the junction during the heating step, and is held under pressure until it has cooled. Examples of the apparatus for accomplishing this method are illustrated in FIGS. 8–10 and 12.

Figure 8:
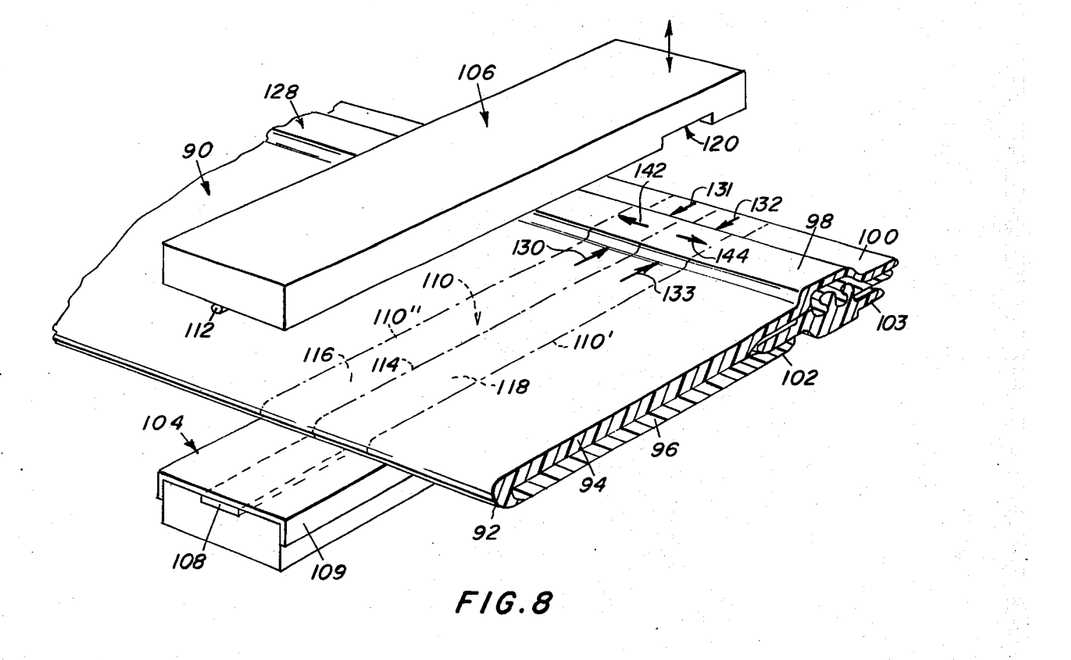
FIG. 8 is a perspective view of a part of an apparatus for effecting the formation of the bead seal barrier of this invention.

FIG. 8 illustrates one embodiment of the apparatus which can be utilized to form the containers of the present invention. In this figure, a continuous sheet of plastic film stock 90 has been folded longitudinally at 92 to form a container blank having front and back walls 94 and 96, the fold providing a container bottom joint at 92. The walls 94 and 96 of the folded stock are secured together by an interlocking fastener 98 which extends continuously along the length of the folded stock adjacent the edges 100 and 102 which will form the top of the container. The upper edge 100 extends beyond the fastener 98 to provide one flap to facilitate the opening and closing of the container, the other flap being formed by an extension 103 of the fastener, in the disclosed form of the closure.

By means of a suitable intermittent or continuous feeding device (not shown) predetermined lengths of the folded plastic stock are fed between the jaws of a sealer having a lower bar 104 and an upper pressure bar 106. At least one of these bars reciprocates periodically to press the stock against the surface of the other bar so that heat and pressure may be applied to the regional area to the folded plastic stock disposed therebetween. Sealing arrangements of this general type are known and in accordance with the prior art, the sealing bar 104 may be of the continuously heated type of the thermal impulse type and is shown to have suitable heating means 108 such as a nichrome heater element mounted thereon and protected by a Teflon-coated fiberglass cover 109.

In operation, a suitable length of the folded plastic container blank 90 is fed through the sealer jaws 104, 106 and the jaws are closed. The sealing bar is heated by current flow through heating element 108, which applies heat to the regional width 110, defined by dotted lines 110' and 110", of the folded sheet stock which is disposed on the sealing bar. As the sheet is heated, bars 104 and 106 exert pressure thereon to form a heat seal in region 110 which welds the walls 94 and 96 together across the width of the folded stock; i.e., from the fold 92 to the top edges 100, 102 and 103, thereby forming one side of each of two adjacent containers. The heat seal so formed in region 110 may then be cut to separate the adjacent containers.

A convenient method of separating the containers is to provide the pressure bar 106 with an elongated cutting element such as a cutting wire 112 which extends the length of the pressure bar, across the width of the folded plastic stock 90. The cutting element is located in the pressure applying region of the pressure bar 106 so that it is in the middle of the regional area of the plastic stock to be heat-sealed. Thus, during the closure of the jaws formed by the sealing bar 104 and the pressure bar 106, as the regional area 110 of the plastic stock 90 is sandwiched between these two bars under heat and pressure, the cutting element passes through the softened plastic and severs the folded sheet material. The stock is cut across its width along a cut line 114, dividing the sealed region 110 int two portions 116 and 118, thereby forming two heat-sealed plastic wall edges for adjacent containers.

Figure 9:
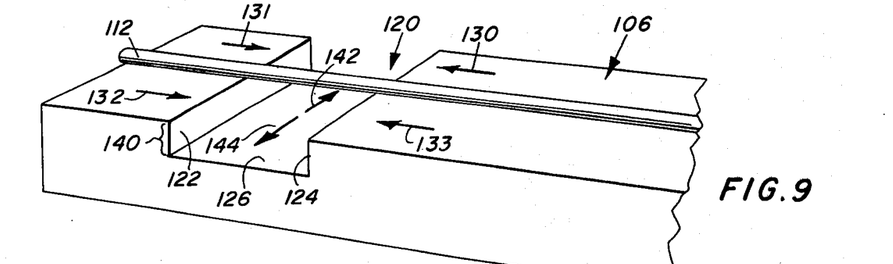
FIG. 9 is a perspective view of the sealing surface of the upper pressure bar of FIG. 8.

As illustrated in FIGS. 8 and 9, the pressure bar 106 of this invention differs in an important respect from prior art bars in that it is provided with a generally U-shaped channel 120, defined by channel side walls 122 and 124 and a top wall 126. The channel and its walls extend laterally across bar 106, are parallel to the length of the plastic sheet stock along the path of travel of the stock as it is advanced. The channel is adapted to receive the portion 128 of the fastener 98 located within the regional area 110. As the pressure bar 106 travels toward the sealing bar 104 during the heat sealing operation, the fastener portion 128 is received by the channel 120 and is snugly straddled and slightly pinched by the channel side walls 122 and 124. As the heat-sealing operation is continued, heat is supplied from the heating element 108 within the sealing bar 104 and pressure is applied by the pressure bar 106 to the regional area 110 of the plastic stock sandwiched between the sealing bar and the pressure bar.

In contrast to the prior art and due to the disposition of the fastener 98 within the channel 120, the pressure on the fastener portion 128 is significantly less than that being applied to the remainder of the regional area 110 of the plastic stock. As a result of this pressure differential, heated plastic from the part of regional area 110 which surrounds portion 128 is forced into the channel 120 in the general direction of the arrows 130–133 of FIGS. 8 and 9. This heated plastic flows into and across the fastener portion 128 which is received and snugly straddled by the channel side walls 122 and 124, the side walls and the top wall 126 containing this plastic flow into the fastener portion 128 as long as the fastener portion remains straddled by the channel. As the pressure bar and sealing bar effect the heat-seal and the pressure of the heat-sealing operation forces plastic into the channel and thus into the fastener, the cutting element 112 travelling with the pressure bar passes through and serves the regional area 110 of the plastic stock along line 114. The cutting element thus separates the plastic stock into two heat-sealed, side edge container portions 116 and 118.

As the pressure bar and the sealing bar reciprocate away from each other at the termination of the heat-sealing operation, the heated plastic which was forced into the channel soldifies and forms a plastic bead seal across the junction of the fastener and the newly formed side edge of each container portion 116 and 118.

When the pressure bar illustrated in FIG. 9 is used, it is preferred that the depth 140 of the channel 120 be slightly less than the thickness of the closure which it is to receive. This depth requirement results in a slight positive pressure on the plastic within the channel to produce a flow of heated plastic out of the channel in the direction of the arrows 142 and 144. This flow is into the areas indicated by the dotted lines 75 and 75' in FIG. 7.

A portion of the finished container made by the operation discussed above is illustrated in FIGS. 5 and 7, where the solidified bead seal 75 is shown to extend across the junction 62 of the fastener 60 with the heat-sealed side edge wall 64. As shown in FIG. 5, the use of channel 120 prevents the bar 106 from deforming the fastener, thus avoiding the stress-created flaws described hereinabove as resulting from the use of the prior art pressure bars. In addition, the pressure exerted by bar 106 on the areas adjacent the seal causes a flow of plastic in the direction of arrows 130–133, 142 and 144 in FIG. 7. It will be noted that FIG. 7 shows two adjacent containers 50, described above, and 50', respresenting the containers formed and severed by a single operation of the sealer mechanism, and it will be seen that the plastic flow into the fastener is restricted and directed by the channel to flow toward the open ends of the channel. Thus, the melted plastic tends to flow into the voids formed adjacent the fastener as well as into and along the grooves formed in the fastener, and between the halves of the fastener, filling the areas indicated at 73, 74 (FIG. 6), 75 and 75' with plastic. When the seat is removed, this plastic hardens in place, thereby sealing the ends of the fasteners at 62 and 62'. Thus, in accordance with the foregoing description, a plastic bead seal is formed across the junction of the side edges and the interlocking fastener of the newly formed containers by controlling a flow of heated plastic under pressure into and across that junction during the heat-sealing operation. As mentioned before, the plastic bead seal of the invention is thereby formed at the point where prior plastic containers have been subject to separation flaws.

Although the pressure bar channel 120 in FIGS. 8 and 9 is depicted as having a generally rectangular shape in a plan view, it should be understood that the channel can take may forms, depending upon the shape of the fastener to be received between the channel walls. Further, the channel need not be in the form of a continuous or uniform groove across the pressure bar but may take other forms depending upon the nature and direction of the plastic flow desired. For example, the plastic flow induced by the channel shape depicted in FIGS. 8 and 9 is in a direction that is generally transverse to the plastic sheet material and into the channelled fastener. However, the plastic may be caused to flow in two or more directions by modifying the form of the channel so that an improved bead seal can be obtained. An illustration of such a modification is provided in FIG. 10 discussed below.

Figure 10:
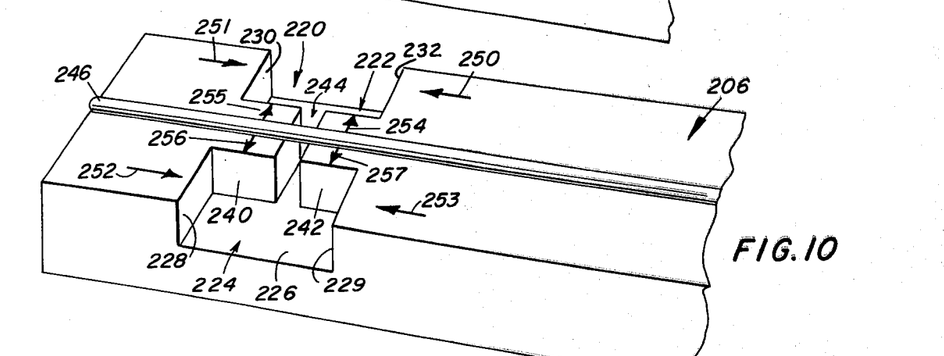
FIG. 10 is a perspective view of a second pressure bar for effecting the formation of the bead seal barrier.

With reference to FIG. 10, the modified pressure bar 206 is provided with a channel 220 having enlarged end sections 222 and 224 which are defined by a common top wall 226 and side walls 228, 229 and 230, 231, respectively. Land areas 240 and 242, which are flush with the surface of the pressure bar, separate and define the end sections 222 and 224 of the channel, define the central, narrow portion 244 of the channel, and also serves as a support for the cutting wire 246 extending the length of the pressure bar. The walls of each section and the main channel extend generally parallel to the path of the folded sheet stock, passing between the pressure bar and the associated sealing bar. Again, the stock is oriented so that a first portion of the continuous interlocking fastener is received in the channel end section 222 and a second portion of the fastener is received in the channel end section 224. A third portion of the fastener, intermediate the first and second portions, is in part received by the narrow channel 244 and in part is contacted by the land areas 240 and 242.

Figure 11:
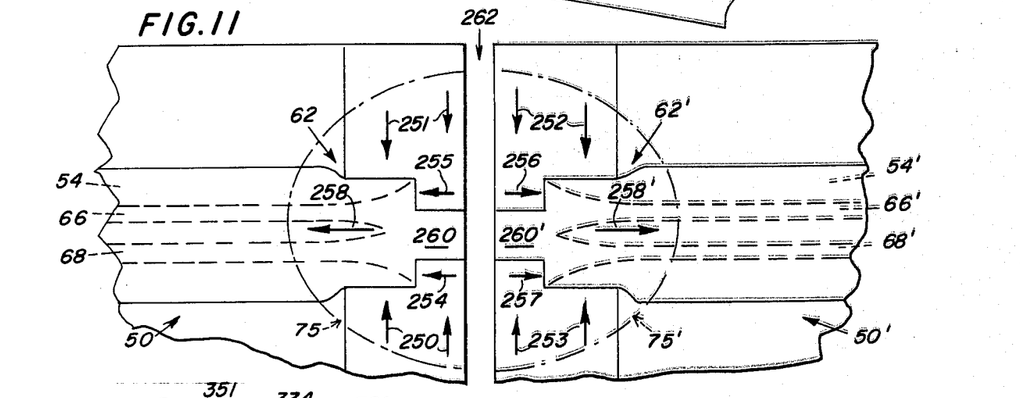
FIG. 11 is a side plan view of a portion of the container formed by the modified apparatus of FIG. 10.

As the heat-sealing operation is effected by means of cooperating pressure bar 206 and sealing bar 104, heat is supplied to the sealing bar and pressure is applied by the pressure bar 206 to the regional area of the plastic stock which is sandwiched therebetween. Due to the disposition of the fastener portions within the end sections 222 and 224, the pressure on these portions is significantly less than that on the surrounding portion of the regional area of the plastic stock which is sandwiched between the pressure bar and the sealing bar. As a result of this pressure differential, heated plastic from the plastic stock is forced into each end of the channel 220 from two directions. One direction of flow is the same as that produced in the embodiment of FIG. 9 and thus is tranverse to the stock sheet, along its width as indicated by the arrows 250–253. The land areas 240, 242 cause a similar transverse flow into channel 244, and further cause another direction of flow generally perpendicular to the transverse flow, as indicated by the arrows 254–257. This longitudinal flow emanates primarily from the portion of the plastic material contacted by the land areas and lying between the first and second fastener portions received in end channels 222 and 224, and is further illustrated in FIG. 11. In FIG. 11, the various elements of containers 50 and 50' are numbered as in FIG. 7, with the arrows 250–258 being added to illustrate the different flow pattern imposed by the configuration of channel 220. It will be seen from this Figure that the narrow portion 244 of the channel and the cooperating land areas will tend to produce a narrowing of the raised fastener near the nascent edges of the containers, as at 260 and 260', the plastic displaced by the land areas being forced into the low pressure areas of the channel end portions 222 and 224. In this manner, the plastic flows into the fastener to form the sealing beads 75 and 75'. Immediately before the heat sealing operation is completed, the cutting element 246 severs the plastic sheet material at 262 into two portions each of which now has a nascent side edge. As the pressure bar and its associate sealing bar reciprocate away from each other at the termination of the heat-sealing operation, the heated plastic which was previously forced into the end channel sections solidifies to form the plastic bead seal across the junction of each fastener portion and its conjugent side edge.

Figure 12:
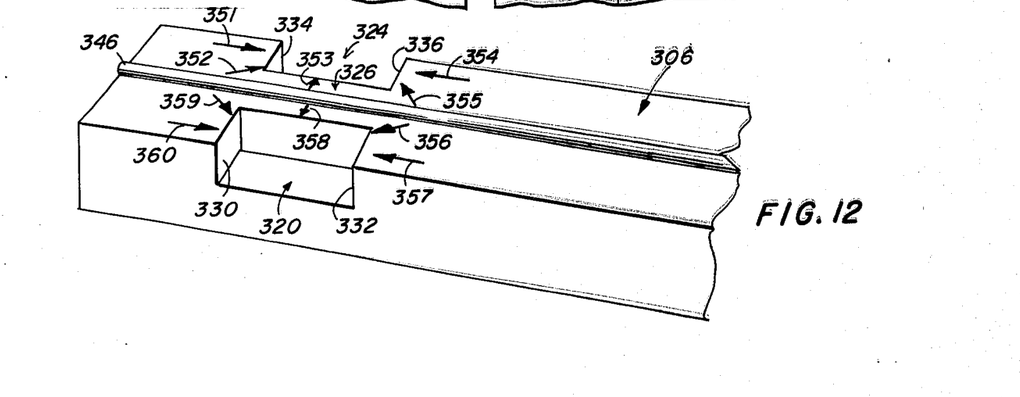
FIG. 12 is a perspective view of a third form of the pressure bar for forming the bead seal barrier.

With reference to FIG. 12, a third pressure bar 306 is provided with two channel sections 320 and 324 which are separated by an uninterrupted area 326. The two channel sections are defined by sidewalls 330, 332 and 334, 336, respectively, and extend generally parallel to the path of the folded sheet stock passing between the pressure bar and the associated sealing bar. The stock is oriented so that a first portion of the continuous interlocking fastener is received in channel portion 320 and a second portion of the fastener is received in the channel portion 324. A third portion of the fastener, intermediate the first and second portions, is contacted by the land area 326. The land area also serves as a support for the cutting wire 346 which extends the length of the pressure bar.

In the embodiment of FIG. 12, a heating element may be carried by the pressure bar. This is an alternative location to that illustrated in FIG. 8, where the heater is shown as being in the anvil 104, but in most instances that is the preferred location. The heat-sealing operation is effected by means of the pressure bar 306 and a cooperating anvil bar, with heat being supplied by heating elements 108 (FIG. 8) and pressure being applied by the pressure bar-anvil bar combination to the regional area of the plastic stock between these two bars. Due to the disposition of the fastener portions within channel portions 320 and 324, the pressure on these fastener portions is significantly less than that is less than that on the intermediate portion of the fastener contacted by the land area 326 and the remaining portion of the regional area of the plastic stock which is sandwiched between the pressure bar and the anvil bar. As a result of this pressure differential, heated plastic is forced into each channel portion from several directions, as indicated by flow arrows 351 to 360. The flow of heated plastic primarily emanates from the portion of the plastic material contacted by the land area 326 and a supplementary flow emanates from the sandwiched plastic stock which is adjacent to this land area. In this manner the plastic flows into the fastener to form bead seals in the channeled portions of the fastener. Immediately before the heat sealing operation is completed, the cutting element 346 severs the plastic sheet material into two portions, each of which now has a nascent side edge. As the pressure bar and cooperating anvil bar move away from each other at the termination of the heat-sealing operation, the heated plastic which was previously forced into the channel sections solidifies to form the plastic bead seal across the junction of each fastener portion and its conjugent side edges.

Although the apparatus shown in FIGS. 8, 9, 10 and 12 is suitable for a single sheet of folded plastic stock having an interlocking fastener of the type described herein, it is within the purview of this invention to provide the pressure bar with two or more channels spaced along the bar to accommodate two or more parallel lines of plastic stock, each having an attached fastener. In this case, the stock may be supplied from corresponding reels holding the folded sheets and fed in parallel paths between the pressure bar and the sealing bar, with each channel of the pressure bar receiving the fastener of a corresponding sheet.

Further, it is within the scope of this invention to provide not only the sealing bar channels illustrated herein, but to modify the arrangement to provide cooperating channels in both the sealing bar and the pressure bar for receipt of opposite sides of the fastener.

It will be apparent that the cutting element illustrated herein does not necessarily have to be mounted along the pressure bar as illustrated in FIGS. 5 to 7 but may be separate from the pressure bar and the sealing bar and located to sever the plastic stock after it has been heat-sealed. In this separate location, the cutting element may take the form of a flying knife or a cutting wire.

The plastic containers made in accordance with this invention have utility in instances where it is necessary to provide a liquid-tight or bacteria-proof container for the storage, shipment, or sterilization of objects such as biological specimens, medical instruments, hospital linen and foods. The material used for the plastic sheet of this invention may be any plastic material which is capable of being adhered to itself upon the application of heat and pressure. The folded plastic sheet stock of this invention may be rigid or semi-rigid and may be made from single-ply, coated, or laminated plastic stock material.

One specific use of the openable and reclosable containers of this invention is for the transfer of biological specimens from doctor's offices to medical research centers. The container usually includes printed or attached information which identifies the specimen and which provides the return address of the office from which the specimen was originally forwarded. In use, the doctor places a preservative in the container and then adds the specimen, after which the container is closed for transfer to the research centers. At the research center the container is opened and the specimen tested. Upon conclusion of the tests, the specimen is reclosed within the container and stored for possible later tests while the results of the initial tests are returned to the doctor.

Many biological specimens are preserved during transfer in liquid materials such as formaldehyde. As is known, formaldehyde has an offensive odor and the passage of this odor through the container walls or the fastener for the container during transfer results in serious handling problems. Obviously, therefore, the plastic sheet stock used to form the walls of the container must be of a material, such as polyethylene coated saran mylar sheet, which acts as a barrier film to control the passage of the preservative odor. However, no matter how effectively the wall material controls the passage of odors therethrough, the fastener for the container must also be odor-tight or the odor would pass into the fastener and through any flaws in the integrity of the fastener. As was explained above, separation flaws occur in the prior art containers primarily at or immediately near the junction of the fastener ends with the heat-sealed side walls of the container. In accordance with the objects of this invention, such separation flaws are eliminated and the junction areas where these flaws were most prevalent are covered or filled by a plastic bead seal which acts as a barrier to the passage of odors out of the container. It has been found that in actual use tests, the bead seal performs the desired function.

Another specific example of the utility of the instant container is as an openable and reclosable autoclave bag for the sterilization of objects such as surgical instruments, hospital linens, surgical uniforms and the like. In this case, the object to be sterilized is placed in the autoclave bag and the bag is closed by a suitable fastener. The bag is then placed under vacuum and a sterilizing gas such as ethylene oxide is passed through the walls of the bag. After the vacuum is removed, the contents of the bag remain sterile. When needed, the sterilized object may be removed from the bag and the empty bag may be reused to sterilize another item.

In the instance where the container is used as an autoclave bag, the sheet stock material used for the walls of the bag must be permeable to ethylene oxide but impermeable to strains of staphylococcus or other contaminating microorganisms. Polyethylene is a suitable material. However, no matter how effectively the wall materials control the passage of contaimating microorganisms therethrough, the fastener of the container must also be bacteria-proof or the contaminats would contact the fastener and pass therealong until they reached a separation flaw in the fastener where they would enter the container and destroy the sterility of the contents. Such separation flaws occur primarily at or immediately near the junction of the fastener ends with the heat-sealed side walls of the container. In accordance with the objects of the present invention, such separation flaws are eliminated and the junction areas where the flaws were most prevalent are covered by a plastic bead seal which acts as a barrier to the passage of contaminating microorganisms into the container.

In tests to determine the effectiveness of the openable and reclosable autoclave bags of this invention, 20 bags were sterilized using ethylene oxide. The sterile bags were then opened and filled partially with a sterile fluid under aseptic conditions. The bags were then closed and placed in a vacuum chamber. A mixed culture of contaminating material including a strain of staphylococcus were sprayed in the vacuum chamber before a vacuum was placed on the bags. Ten bags were subjected to one vacuum cycle and the other ten bags were subjected to five vacuum cycles.

Of the ten bags subjected to one vacuum cycle, all ten were found to remain sterile at the completion of the cycle. Of the ten bags subjected to the five vacuum cycles, nine were found to remain sterile at the completion of the five cycles. Accordingly, the bags and the fasteners for the bags were found to be suitably resistant to the penetration of the mixed culture.

Although several possible modifications of the methods and apparatus for making the containers of this invention have been given and several uses of the resultant container have been disclosed, it will be apparent to those skilled in the art that many modifications of the disclosed invention are possible without departing from the essence and spirit of the invention.

What is claimed is:

1. A method for forming a plastic bead seal at the end of an openable and reclosable fastener which is formed of two mating portions each positioned along the edges of respective plastic sheets, said fastener being closable to secure said edges together; which method comprises the steps of:

supporting the closed fastener end and respective regional areas of the plastic sheets adjacent the fastener end between a sealing means and a pressure means;

mounting said sealing means and said pressure means for relative motion toward each other to engage the outer surfaces of the plastic sheets and the fastener;

applying pressure to the outer surfaces of the plastic sheets and the fastener end;

creating a pressure differential between the fastener end and said respective regional areas of the plastic sheets by straddling and pinching the fastener end within a channel formed on one of said sealing and pressure means;

heating to a plastic flowable condition while applying pressure to the fastener end and said respective regional areas of the plastic sheets, whereby said pressure differential causes heated plastic to flow from said respective regional areas under pressure into and across the fastener end; and solidifying the plastic flow to form a plastic bend seal at the fastener end.

2. The method of claim 1, wherein said differential pressure is applied so that the fastener end is at a lower pressure than said respective regional areas adjacent the fastener end.

3. The method of claim 1, wherein said pressure differential is created within a generally U-shaped channel which straddles the fastener end to force heated plastic from said respective regional areas into said channel and thus into the fastener end.

4. The method of claim 1, wherein said pressure differential is created within a generally U-shaped channel having enlarged channel end portions and central land areas, said enlarged channel end portions straddling the fastener end to force heated plastic from said respective regional areas transversely of said fastener toward and across the fastener end, and said central land areas providing pressure on portions of the fastener end to force heated plastic longitudinally of into and around the fastener end.

5. The method of claim 1, further including the step of severing the fastener end and adjacent respective regional areas prior to solidifying said plastic flow to form two separate adjacent fastener ends each having a bead seal.

6. A method for forming a plastic bead seal at the junction of the ends of an openable and reclosable fastener with a side wall of a plastic container, comprising the steps of:

heating the junction between a closed said fastener and said sidewall and a regional area of the said sidewall adjacent said junction to a plastic flowable condition;

applying pressure to said junction and to said regional area;

creating a pressure differential between said junction and said regional area by straddling and pinching said fastener end in a generally U-shaped channel member so that said junction is at a lower pressure than said adjacent regional area during the application of heat and pressure;

forcing heated plastic to flow under said differential pressure from said regional area toward said junction transversely of said fastener and across said fastener end; and solidifying the plastic flow to form a bead seal within said fastener at said junction.

7. The method of claim 6, including the step of producing plastic flow transversely across and longitudinally along said fastener at said junction by straddling the fastener end with a channel having enlarged channel end portions and central land areas.

8. The method of claim 6, further including dividing said regional area of the plastic container and said fastener end into two portions following the flow of heated plastic material into said fastener end to thereby form adjacent but separated containers each having bead seals at a junction of a fastener with a side wall.

9. A method of forming, in containers having a slideless fastener closure across one end thereof, liquid-tight junctions between said fastener closure and the walls of said containers, said containers being formed from stock material comprising first and second walls formed from at least one continuous length of plastic sheet material and having a closed fastener strip positioned along adjacent longitudinal edge portions of said first and second walls, said closed fastener strip extending the length of said sheet material, comprising the steps of:

supporting said stock material between a sealing means and a pressure means extending generally transverse to the length of said stock material and movable with respect to said sealing means for gripping said stock material;

applying pressure to said stock material gripped between said sealing means and said pressure means;

creating a pressure differential between the pressure applied to a regional area of said sheet material adjacent the fastener strip and the pressure applied to said fastener strip by straddling and pinching the fastener strip with a U-shaped channel formed in one of said sealing means and pressure means so that the pressure applied to said fastener strip is lower than that applied to the regional area of said sheet material adjacent said fastener strip;

heating at least a portion of said plastic stock material gripped between said sealing and pressure means to weld said first and second walls together to form a container side and to weld said mating portions of said fastener strip together within the area straddled by said U-shaped channel, said pressure differential forcing heated plastic to flow from the regional area of said sheet material adjacent said fastener strip into and transversely across the portion of said fastener strip within said U-shaped channel to form a bead seal within and surrounding said fastener at the junction of said fastener strip with said container side.

10. The method of claim 9, further including splitting said stock material into two portions laterally along the portions of said first and second walls and said fastener strip welded together by said heating step, thereby providing two separate container wall sides each having a junction with a corresponding section of fastener strip, and each fastener strip having a bead seal at said junction.

11. The method of claim 9 wherein the step of creating a differential pressure comprises straddling and pinching the fastener strip with a U-shaped channel having at least one enlarged end portion and a central land area, said pressure differential forcing heated plastic to flow from the regional area of said sheet material adjacent said fastener strip into, transversely across, and longitudinally along, the portion of said fastener strip within said U-shaped channel to form said bead seal.

* * * * *

UNITED STATES PATENT AND TRADEMARK OFFICE
CERTIFICATE OF CORRECTION

PATENT NO. : 3,986,914
DATED : October 19, 1976
INVENTOR(S) : H. Keith Howard

It is certified that error appears in the above-identified patent and that said Letters Patent are hereby corrected as shown below:

Claim 1, line 27 (line 3, Col. 15)
 change "bend" to --bead--.

Claim 3, line 1, change "1" to --2--.

Claim 4, line 1, change "1" to --2--.

Claim 5, line 1, change "1" to --2--.

Claim 9, line 33, after "U-shaped",
 cancel the comma (",").

Signed and Sealed this

Fifteenth Day of February 1977

[SEAL]

Attest:

RUTH C. MASON
*Attesting Officer*

C. MARSHALL DANN
*Commissioner of Patents and Trademarks*